US006170517B1

United States Patent
Hazen et al.

(10) Patent No.: US 6,170,517 B1
(45) Date of Patent: Jan. 9, 2001

(54) REPLACEABLE FLOW-CONTROL ASSEMBLY FOR USE IN A FLUID FLOW LINE

(75) Inventors: Larry H. Hazen, Tama, IA (US); Steve Stahl, Grand Prairie, TX (US)

(73) Assignee: Fisher Controls International, Inc., Clayton, MO (US)

( * ) Notice: Under 35 U.S.C. 154(b), the term of this patent shall be extended for 0 days.

(21) Appl. No.: 09/404,915

(22) Filed: Sep. 24, 1999

Related U.S. Application Data

(63) Continuation-in-part of application No. 08/968,325, filed on Nov. 12, 1997, now Pat. No. 5,975,122.
(60) Provisional application No. 60/063,371, filed on Nov. 19, 1996.

(51) Int. Cl.[7] .................................................. F16K 51/00
(52) U.S. Cl. .......................... 137/343; 364/371; 364/382
(58) Field of Search .................................. 137/382, 315, 137/364, 371, 343

(56) References Cited

U.S. PATENT DOCUMENTS

| 712,759 | * | 11/1902 | Breen | 137/269 |
|---|---|---|---|---|
| 2,177,620 | * | 10/1939 | White | 137/364 |
| 2,217,583 | * | 10/1940 | White | 137/364 |
| 3,741,236 | * | 6/1973 | Pass et al. | 137/269 |
| 4,311,167 | * | 1/1982 | Stoves et al. | 137/454.2 |
| 4,431,022 | * | 2/1984 | Ripert | 137/315 |
| 4,986,301 | * | 1/1991 | Ziliani et al. | 137/315 |
| 5,975,122 | * | 11/1999 | Hazen et al. | 137/382 |

* cited by examiner

Primary Examiner—A. Michael Chambers
(74) Attorney, Agent, or Firm—Marshall, O'Toole, Gerstein, Murray & Borun

(57) ABSTRACT

A single-piece flow-control assembly is configured to be disposed within a pit assembly in a manner which allows the flow-control assembly to be easily and quickly removed and replaced. The flow-control assembly includes one or more regulators rigidly connected to a mounting assembly having two coupling mechanisms adapted to rigidly mount to at least one of a fluid inlet pipe or a fluid outlet pipe at locations away from the ends of these pipes. The coupling mechanisms provide a sealed engagement between the ends of the flow-control assembly and the fluid inlet pipe and the fluid outlet pipe when the flow-control assembly is properly installed within the pit assembly. A fluid passageway with a 180 degree bend therein may be provided as part of the flow-control assembly so that the coupling mechanisms simultaneously couple to or decouple from the fluid inlet and outlet pipes by movement of the flow-control assembly in one direction.

17 Claims, 3 Drawing Sheets

REPLACEABLE FLOW-CONTROL ASSEMBLY FOR USE IN A FLUID FLOW LINE

RELATED APPLICATION

This is a continuation in part of patent application Ser. No. 08/968,325, filed Nov. 12, 1997, now U.S. Pat. No. 5,975,122, issued Nov. 2, 1999, which is based on and claims benefit from provisional application Ser. No. 60/031,371, filed Nov. 19, 1996.

TECHNICAL FIELD

The present invention relates generally to fluid flow lines and, more particularly, to a flow-control assembly having fluid flow control components that can be easily removed from and inserted into a fluid flow line.

BACKGROUND OF THE ART

Fluid flow systems, such as natural gas distribution systems, include a network of fluid flow lines that distribute fluid from a fluid source, such as a gas provider, to a number of individual users at, for example, houses, apartment buildings, etc. Typically, the fluid flow lines associated with a gas distribution system are disposed underground and have regulators, valves and/or other fluid flow control components disposed at advantageous control points within the lines. The control components regulate the flow of gas from a high-pressure side associated with the fluid provider to a low-pressure side associated with a fluid user.

To aid in the maintenance of, for example, gas lines, the regulators, valves and other components at a control point are disposed in above-ground stations or pit assemblies that allow access to these components. Pit assemblies are usually located underground and are large enough so that a service person can enter the pit assembly to access, test, repair and/or replace the regulators or other flow control components within the pit assembly.

In a standard configuration, each pit assembly includes two sets of redundant regulators connected in parallel between a gas inlet (coupled to a gas provider) and a gas outlet (coupled to a gas user). One of these sets of regulators comprises a main flow line that is used to control fluid flow during normal operation of the gas system while the other set of regulators comprises a backup line that remains unused while the main line is operational. In another standard configuration, two pit assemblies are placed in series separated by a length of pipe, per local requirements, with one set of regulators in each pit assembly. During operation, one of these sets of regulators may be used to actively control fluid flow during normal operation of the gas system while the other set of regulators may comprise a backup line that monitors flow when the active set is operational (a worker/monitor set-up). Alternatively, both of these sets of regulators may be used to control fluid flow during normal operation so as to maintain an intermediate pressure between the pit assemblies (a series regulator set-up). In either of these cases, by-pass lines would be included to allow isolation of the regulator sets from the main line.

When one or more of the regulators or other components associated with the main line needs to be tested, repaired or replaced, the backup or by-pass line is switched into use to provide a constant flow of gas to the gas users. Thereafter the main line is disassembled and the components thereof are tested, repaired or replaced as necessary. This disassembly procedure can take a significant amount of time due to the number of nuts, bolts, and other fasteners which must be removed to disassemble the components of the main line. During this time, surface traffic flow around the installation may be disrupted. Furthermore, removal of components of either the main line or the backup line is impaired by the limited amount of space within the pit assembly and by the hard-to-reach nature of some of the components within the pit assembly. Sometimes, special precautions must also be taken before entering a pit assembly to perform test, repair, or maintenance work. Such precautions may include venting the pit assembly, which requires an external air supply and adds to the time and cost associated with performing maintenance. It is desirable to reduce the size of a pit assembly and to make fluid flow lines less expensive to build and faster, safer and easier to maintain.

SUMMARY OF THE INVENTION

The present invention is directed to a flow-control assembly disposed within a pit assembly in a manner which allows the flow-control assembly to be easily and quickly removed and replaced without requiring a service person to actually enter or crawl down into a pit assembly. This flow-control assembly also enables a pit assembly to be reduced in size because the pit assembly does not need to provide space for a service person to enter the pit assembly. Smaller pit assembly size means less space is required for installation and may help to reduce installed station cost. Reduced pit assembly size also eliminates the possibility of a service person entering a pit assembly which removes the dangers associated with entering confined spaces.

According to one aspect of the present invention, a flow-control assembly includes one or more rigidly connected fluid control components, such as regulators, valves etc., and coupling mechanisms disposed on each end thereof. The coupling mechanisms are configured to engage a fluid inlet pipe and a fluid outlet pipe within a pit assembly in a sealed manner. Preferably, the coupling mechanisms comprise female or male coupling ends that mate with male or female coupling ends disposed on the fluid inlet and outlet pipes. If desired, the seal may be provided by an O-ring seal disposed in, for example, the female coupling ends.

In one embodiment, the flow-control assembly includes a fluid passageway with a 180 degree bend therein so that the coupling ends on each end of the flow-control assembly simultaneously couple to or decouple from the coupling ends disposed on the fluid inlet and outlet pipes by movement of the flow-control assembly in one direction.

The flow-control assembly may also include a mounting assembly adapted to rigidly mount to at least one of the fluid inlet pipe or the fluid outlet pipe within the enclosure. The mounting assembly holds the first coupling mechanism and the fluid inlet pipe in sealed engagement and the second coupling mechanism and the fluid outlet pipe in sealed engagement. The flow-control assembly may also include a handle disposed along the center of gravity thereof at an upper portion of the flow-control assembly to allow easy removal of the flow-control assembly from the pit assembly. In a preferred embodiment, the flow-control assembly is a rigid, single-piece assembly, having all of the components thereof welded or otherwise rigidly connected together.

DESCRIPTION OF THE PREFERRED EMBODIMENT

Figure 1:
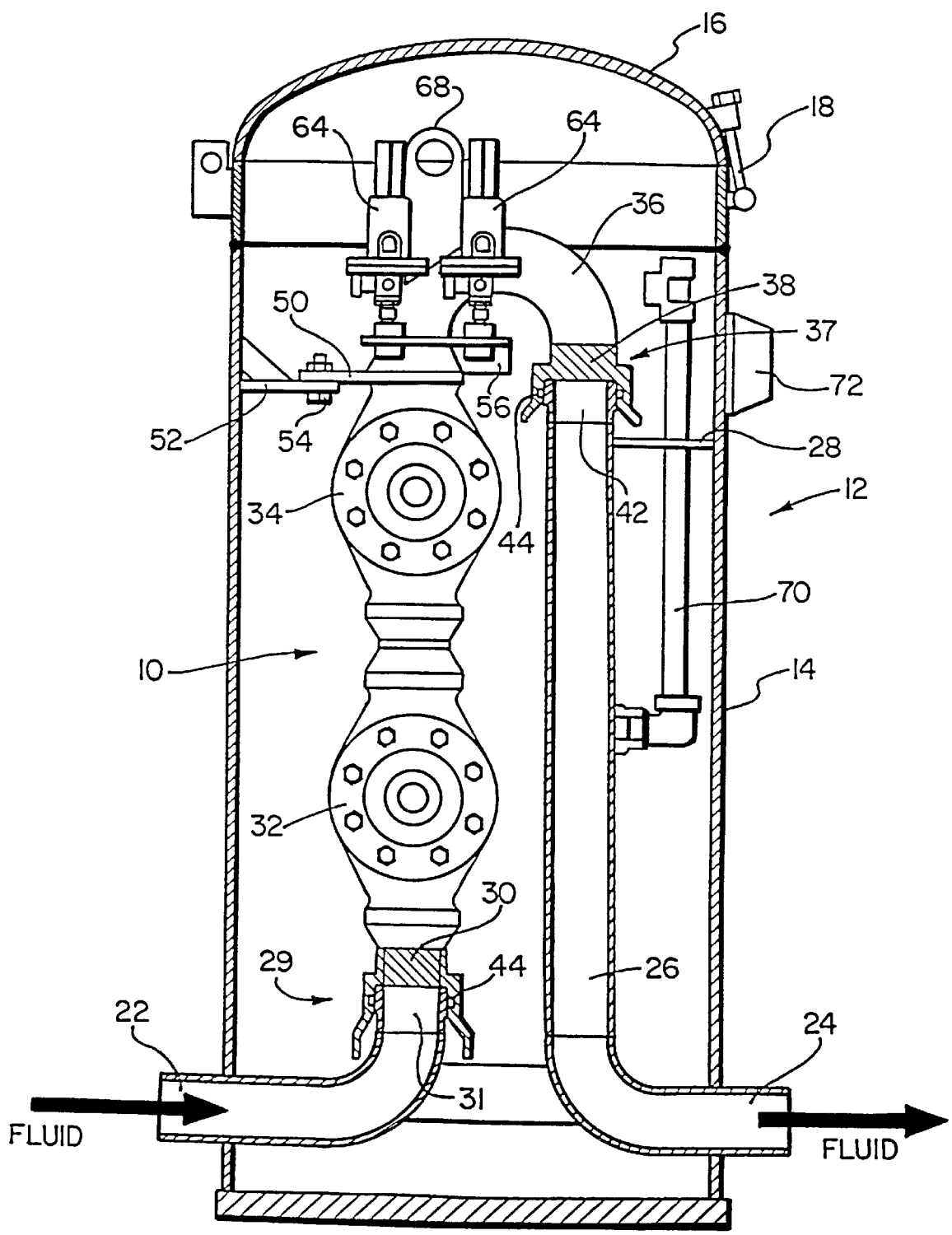
FIG. 1 a side view of a flow-control assembly disposed within a pit assembly (illustrated in cross-section)
Figure 2:
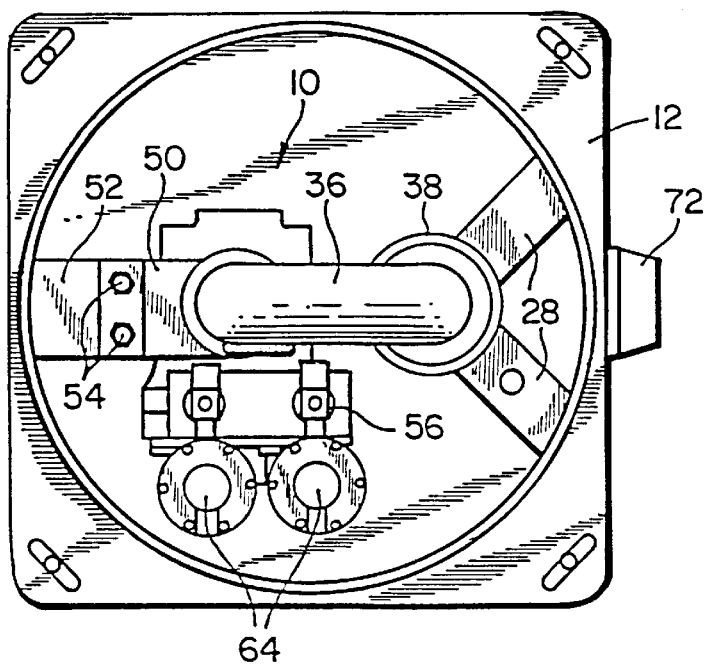
FIG. 2. is a top view of the flow-control assembly and the pit assembly of FIG. 1 with the cover of the pit assembly removed.

Referring now to FIG. 1, a flow-control assembly 10 constructed according to the present invention is disposed within a pit assembly 12 having a lower portion or can 14 and a cover assembly 16 disposed on the can 14. The cover assembly may be, for example, welded onto the can 14 and opened in a hinged manner. The pit assembly 12 is preferably constructed for use underground with the cover assembly 16 being disposed in an accessible manner. A number of bolts 18, for example, four, may be loosened to allow the cover assembly 16 to be opened and thereby provide access to the flow-control assembly 10. Of course, any other desired closure mechanism may be used with the pit assembly 12. FIG. 2 illustrates a top view of the flow-control assembly 10 with the cover assembly 16 of the pit assembly 12 opened.

As illustrated in FIG. 1, the flow-control assembly 10 is coupled between a fluid inlet pipe 22 coming from a fluid source and a fluid outlet pipe 24 going to a fluid user. The fluid outlet pipe 24 includes an extension pipe 26 rigidly connected to the can 14 by a bracket 28 (illustrated in detail in FIG. 2).

The flow-control assembly 10 is coupled to the fluid inlet pipe 22 via a first coupling mechanism 29 having a female coupling end 30 (illustrated in FIG. 1 in cross-section) disposed on the flow-control assembly 10 and a male coupling end 31 disposed on the fluid inlet pipe 22. The male coupling end 31 mates with the female coupling end 30 in a sliding manner.

Figure 3:
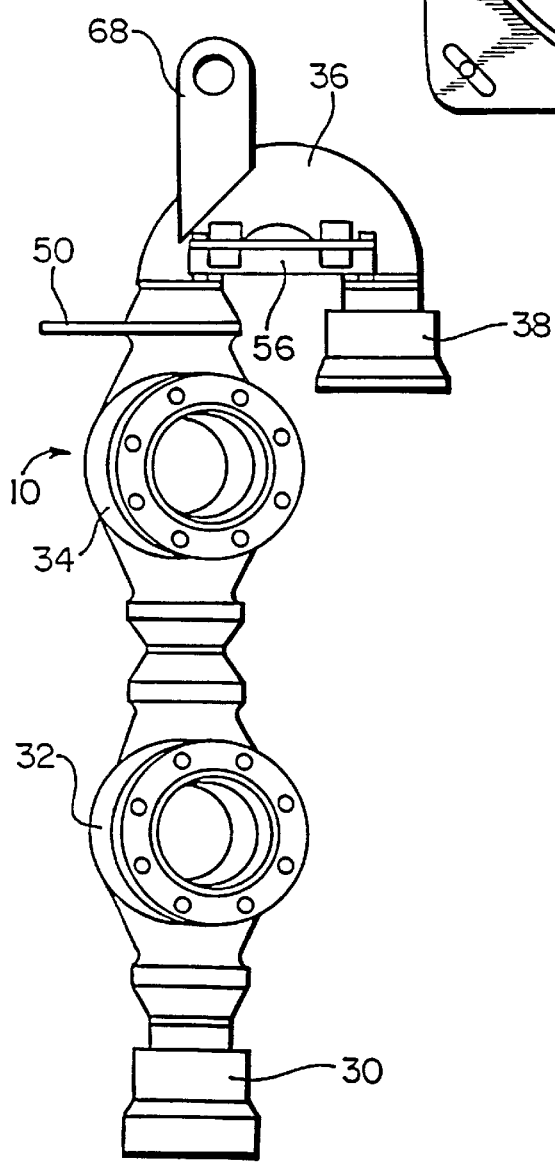
FIG. 3 is a perspective view of the flow-control assembly of FIG. 1 without the trim and pilots of the regulators.
Figure 4:
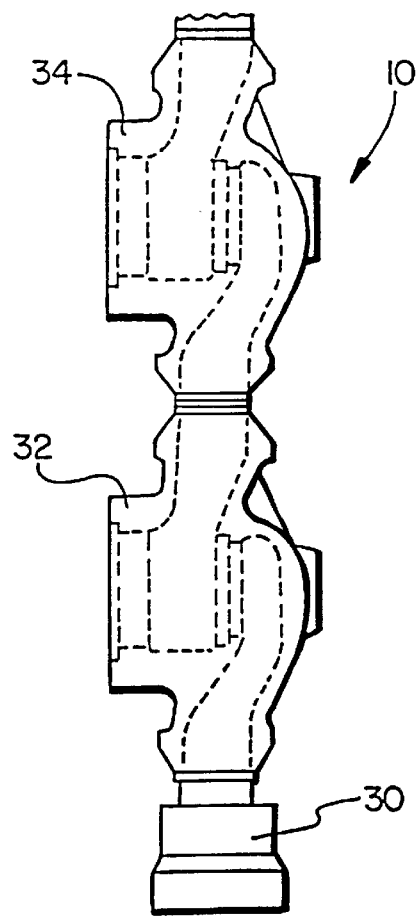
FIG. 4 is a side view of regulator bodies of the flow-control assembly of FIG. 1 illustrating, in phantom relief, the internal fluid passageways therein.

The female coupling end 30 is fluidly connected to a first regulator 32 which, in turn, is fluidly connected to a second regulator 34. FIGS. 3 and 4 illustrate the regulator bodies of, and the fluid passageways within, the regulators 32 and 34 in more detail. The regulators 32 and 34 may comprise pilot-operated regulators, such as the 399A regulator manufactured by Fisher Controls Regulator Division, or may be any other desired type of regulator, valve or other control component for controlling fluid flow between the fluid inlet pipe 22 and the fluid outlet pipe 24 in any desired manner. Of course the regulators 32 and 34 may be the same or different types of regulators or other components as desired.

The regulator 34 is rigidly connected to a 180 degree bend return pipe 36 which, in turn, is coupled to the extension pipe 26 via a second coupling mechanism 37. The coupling mechanism 37 has a female coupling end 38 (illustrated in FIG. 1 in cross-section) disposed on the return pipe 36 and a male coupling end 42 disposed on the extension pipe 26 so that the male coupling end 42 mates with the female coupling end 38 in a sliding manner. O-rings 44 are disposed within, for example, the female coupling ends 30 and 38 to seal the fluid line at those connection points when the flow-control assembly 10 is properly installed within the pit assembly 12. If desired, the female coupling ends 30 and/or 38 may be disposed on the pipes 22 and/or 26 while the male coupling ends may be disposed on the flow-control assembly 10 in any fashion to provide a sealed engagement between the flow-control assembly 10 and the fluid inlet pipe 22 and the fluid outlet pipe 24.

The flow-control assembly 10 may include a bracket 50 rigidly attached to the regulator 34 and/or the return pipe 36. The bracket 50 is designed to mate with a bracket 52 rigidly attached to the an inner wall of the can 14 of the pit assembly 12. As illustrated in FIG. 2, the bracket 50 includes, for example, two bolt holes which accept nut and bolt assembles 54 associated with the bracket 52. The bolts of the nut and bolt assemblies 54 may be welded to the bracket 52 so that the holes of the bracket 50 can be inserted over these bolts to align the flow-control assembly 10 with the fluid inlet and fluid outlet pipes 22 and 24. When the nuts of the nut and bolt assemblies 54 are attached to the bolts and tightened, the flow-control assembly 10 is held rigidly in place by the brackets 50 and 52 to assure a sealed engagement between the ends of the coupling mechanisms 29 and 37.

A further bracket 56 (illustrated in slightly different positions in FIGS. 2 and 3) may be attached to the flow-control assembly 10 and used to mount pilots 64 of the regulators 32 and 34 or to mount any other desired equipment. As illustrated in FIGS. 1 and 3, the flow-control assembly 10 may also include a handle 68 welded or otherwise rigidly attached to the flow-control assembly 10. Preferably, the handle 68 is attached to an upper portion of the flow-control assembly 10 such as the return pipe 36 when the flow-control assembly 10 is properly disposed within the pit assembly 12. Likewise, the handle 68 is preferably attached to the flow-control assembly 10 along the line of the center of gravity of the flow-control assembly 10 so that the flow-control assembly 10 may be lowered into or removed from the pit assembly 12 in a stable manner using only the handle 68.

Figure 5:
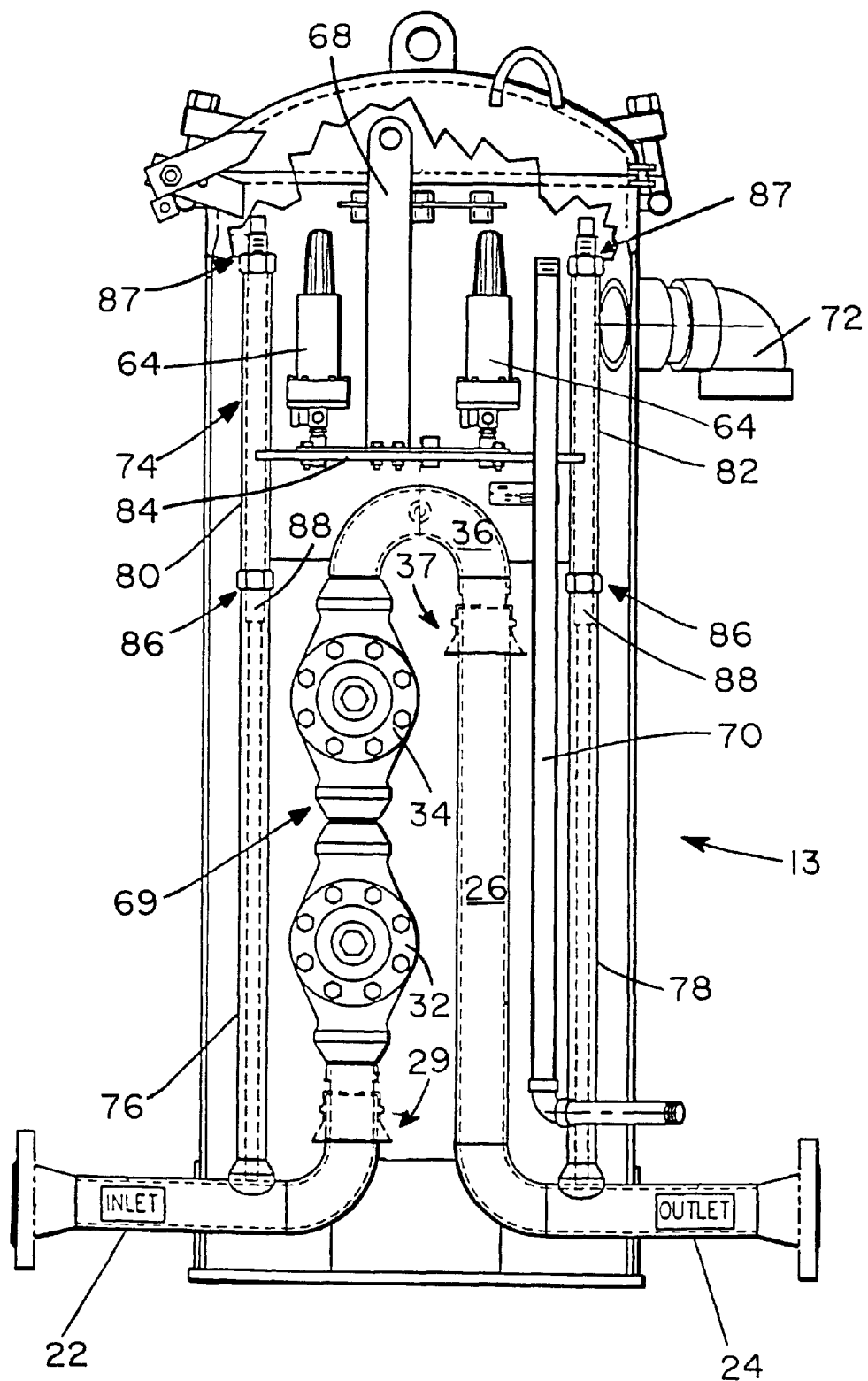
FIG. 5 is a side view of a second embodiment of a flow-control assembly disposed within a pit assembly.

Referring now to FIG. 5, a second flow-control assembly 69 is illustrated. The flow-control assembly 69 includes parts similar to the flow-control assembly 10, which are indicated by the same reference numerals shown in FIG. 1. Thus, the flow control assembly 69 is similar to the assembly 10 of FIG. 1, however, it includes a mounting assembly 74 instead of the mounting element 50. In addition, the enclosure 13 in which the flow-control assembly 69 is adapted to be disposed includes a first bar 76 that is permanently and rigidly mounted (via, for example, a weld) to the fluid inlet pipe 22 and a second bar 78 that is also permanently and rigidly mounted to the fluid outlet pipe 24. Together the mounting assembly 74 and the first and second bars 76 and 78 of the enclosure 13 provide an improved sealed engagement between the first coupling mechanism 29 and the fluid inlet pipe 22 and the second coupling mechanism 37 and the fluid outlet pipe 24.

The mounting assembly 74 may be adapted to rigidly mount to at least one of the fluid inlet pipe 22 or the fluid outlet pipe 24 and holds the first coupling mechanism 29 and the fluid inlet pipe 22 in sealed engagement and the second coupling mechanism 37 and the fluid outlet pipe 24 in sealed engagement. In FIG. 5 the mounting assembly 74 is rigidly mounted to both the fluid inlet pipe 22 and the fluid outlet pipe 24.

The mounting assembly 74 includes a first tube 80 adapted to be removably and rigidly mounted to the first bar 76 of the enclosure 13 and a second tube 82 adapted to be removably and rigidly mounted to the second bar 78 of the enclosure 13.

Preferably the first and second tubes 80 and 82, respectively, of the mounting assembly 74 are mounted to the first and second bars 76 and 78, respectively, of the enclosure 13 via fastener assemblies. The fastener assemblies preferably include nut and bolt assemblies 86, 87 as shown in FIG. 5, but may also include nut and screw assemblies, nut and threaded stud assemblies, or other like devices. The first and second bars 76 and 78 of the enclosure 13 each include a threaded bore 88 for accepting a first end of a bolt of nut and bolt assembly 86. The first and second tubes 80 and 82 of the mounting assembly 74 each include a through-hole for accepting a second end of the bolt of the nut and bolt assemblies 86 therethrough.

The first ends of the bolts or other threaded fasteners, e.g., threaded studs or screws, are first permanently mounted to the first and second bars 76 and 78 of the enclosure via a liquid sealant. Specifically, the liquid sealant is applied to the first ends of the threaded bolts and then the first ends of the threaded bolts are inserted into the bores 88 of the first and second bars 76 and 78 of the enclosure, thereby forming a rigid and permanent connection between the bolts and the first and second bars 76 and 78 once the liquid sealant solidifies. To further reinforce this rigid connection, the nuts of the nut and bolt assemblies 86 are then tightened.

After the first ends of the bolts have been permanently mounted to the first and second bars 76 and 78 of the enclosure 13, the second ends of the bolts are inserted through the through-holes of the first and second tubes 80 and 82. The nuts of the nut and bolt assemblies 87 are then tightened, thereby rigidly and removably mounting the mounting assembly 74 to the first and second bars 76 and 78 of the enclosure and, thereby to the pipes 22 and 24.

The flow-control assembly 69 may further include a plate 84 rigidly mounted to the first and second tubes 80 and 82. The first and second tubes 80 and 82 of the mounting assembly 74 are thus also permanently and rigidly mounted to the 180 degree bend return pipe 36 via the plate 84. The plate 84 includes, for example, four holes which accept nut and bolt assemblies used to rigidly mount any desired equipment, for example, the pilots 64 of the regulators 32 and 34, to the plate 84 and, thus, to the flow-control assembly 69.

The handle 68 is preferably mounted to the plate 84 of the flow-control assembly 69 along the line of the center of gravity of the flow-control assembly 10 so that the flow-control assembly 10 may be lowered into or removed from the pit assembly 12 in a stable manner (and relatively straight manner) using only the handle 68.

In the embodiment of FIGS. 1–4, all of the components of the flow-control assembly 64, including the regulators 32 and 34, the return pipe 36, the coupling ends 30 and 38, the brackets 50 and the handle 68 are rigidly connected together via, for example, welds, to form a single-piece flow-control assembly.

In the embodiment of FIG. 5, all of the components of the flow-control assembly 69, including the regulators 32 and 34, the return pipe 36, the coupling ends 30 and 38, the mounting assembly 74, and the handle 68 are rigidly connected together to form a single piece flow-control assembly.

When the flow-control assembly 10 or 69 is properly installed within the pit assembly 12 or 13 as illustrated in FIGS. 1 and 5, the pilots 64 of the regulators 32 and 34 may be connected to the extension pipe 26 via a return pipe 70 held within the bracket 28. It is understood that the pilots 64 and/or other parts of the regulators 32 and 34 may be connected to the return pipe 70 via tubing not illustrated in either FIG. 1 or FIG. 5. Likewise, the regulators 32, 34 and/or the pilots 64 associated therewith may also be connected via tubing to an exhaust outlet 72 disposed within a wall of the can 14. The exhaust outlet 72 enables the flow-control assembly 10 or 69 to exhaust fluid out of the pit assembly 12 or 13 to prevent pressure buildup within the pit assembly 12 or 13. If desired, the exhaust outlet 72 may be fluidly connected to a recovery container or may be vented to the atmosphere. For the sake of simplicity, the tubing between the regulators 32, 34, the pilots 64, the fluid return pipe 70 and the exhaust outlet 72 are not illustrated in FIGS. 1–5, it being understood that the connection of this tubing is known in the art and can be performed in any desired manner.

During operation of the flow-control assemblies 10 and 69 and the pit assemblies 12 or 13, one of the regulators 32 and 34, for example regulator 32, may be configured as a working regulator while the other of the regulators, for example, regulator 34, may be configured as a monitoring regulator having a slightly higher downstream pressure set-point than the working regulator 32. When fluid is provided through the fluid inlet pipe 22 to the working regulator 32, the regulator 32 controls the downstream fluid pressure at the fluid outlet pipe 24 to remain at a predetermined set-point value. When the working regulator 32 operates correctly, the monitoring regulator 34 operates in an open condition to allow the working regulator 32 to control the downstream fluid pressure completely. If the working regulator 32 malfunctions and allows the downstream pressure to exceed the set-point pressure of the monitoring regulator 34, the monitoring regulator 34 thereafter operates to limit the downstream pressure to the set-point value of the monitoring regulator 34. If desired, a safety slam-shut valve may be disposed between the working regulator 32 and the fluid inlet pipe 22. This slam-shut device may detect the downstream pressure and shut off the fluid flow through the flow-control assembly 10, 69 if the downstream pressure reaches a predetermined amount above the set-point value of the monitoring regulator 34 (which occurs if both the working regulator 32 and the monitoring regulator 34 malfunction).

Although the flow-control assemblies 10, 69 are described herein as including two regulators disposed in series, it is considered that any other number and/or any desired types of fluid flow control components, such as valves, filters, pressure control devices, etc. may be integrated into or used to form a flow-control assembly according to the principles described herein for any desired fluid flow control operation.

As will be evident to those skilled in the art, the flow-control assemblies 10 and 69 can be easily and quickly removed from the pit assembly 12 or 13 by first closing isolation valves upstream of the fluid inlet pipe 22 and downstream of the fluid outlet pipe 24, and then loosening the bolts 18, opening the cover assembly 16 to expose the flow-control assembly 10 or 69, removing the nuts from the nut and bolt assemblies 54, 87, removing the tubing between the regulators 32, 34, the pipe 70 and the outlet 72, and pulling on the handle 68 until the flow-control assembly 10 or 69 disengages from the fluid inlet and the fluid outlet pipes 22 and 24. A new and identical flow-control assembly 10 or 69 having functioning components may then be lowered into the can 14 until the coupling ends 30 and 38 of the new flow-control assembly 10 or 69 contact and completely engage the coupling ends 31 and 42 on the pipes 22 and 26 and so that either the holes in the bracket 50 are disposed around the bolts of the nut and bolt assemblies 54 or the through-holes of the first and second tubes 80 and 82 are disposed around the bolts of the nut and bolt assemblies 87. Thereafter, tubing is connected between the regulators 32, 34, the pipe 70 and the outlet 72 and fluid flow is reestablished through the pit assembly 12 or 13 by opening the upstream and downstream isolation valves. The components of the removed flow-control assembly 10 may be tested, repaired and/or replaced at leisure in a suitable working environment.

Because of the ease and quickness associated with removing and replacing the flow-control assembly 10 or 69, minimal traffic tie-ups are created during station testing and maintenance. Also, as will be evident, a service provider can quickly remove and replace the flow-control assembly 10 or 69 without having to crawl down into the pit assembly 12 or 13 and without having to remove and replace numerous bolts and nut assemblies or other connector fittings. This advantage enables the pit assembly 12 or 13 to be smaller because the pit assembly 12 or 13 does not need to provide space for a service provider to enter the pit assembly when testing, disassembling and reassembling the fluid flow components within the pit assembly. Removal of the need to crawl down into a pit assembly to test or maintain equipment provides a significant safety benefit.

Notably, one of the reasons that the flow-control assembly 10 or 69 is so easily replaced is that the coupling ends 30 and 38 simultaneously disconnect from or connect to the fluid inlet pipe 22 and the extension pipe 26 by being moved in the same direction. In effect, one motion (e.g., pulling on the handle 68 or lowering the flow-control assembly 10 or 69 into the pit assembly 12 or 13) decouples the flow-control assembly 10 or 69 from or couples the flow-control assembly 10 or 69 to both the fluid inlet pipe 22 and the extension pipe 26 without having to remove any bolt and nut assemblies at the connection points between the flow-control assembly 10 or 69 and the rest of the fluid flow line. Furthermore, due to the placement of the brackets 50 and 52 in the first embodiment of the flow-control assembly 10 and the placement of the mounting assembly 74 and the first and second bars 76 and 78 of the enclosure in the second embodiment of the flow-control assembly 69, a service person does not need to get into the pit assembly 12 or 13 to test, remove or replace the flow-control assembly 10 or 69, which shortens the time needed to test, remove or replace the fluid flow control components within the pit assembly 12 or 13.

While the coupling mechanisms 29 and 37 have been illustrated as having female and male ends that sealingly engage each other, other types of sealable coupling members may be used instead. Preferably however, the couplings used with the flow-control assembly 10 or 69 will not use nut and bolt or other types of fittings that take a protracted amount of time to engage or disengage and/or which require a service person to reach down into or crawl down into the pit assembly 12 or 13 to engage or disengage.

While the present invention has been described with reference to specific examples, which are intended to be illustrative only, and not to be limiting of the invention, it will be apparent to those of ordinary skill in the art that changes, additions and/or deletions may be made to the disclosed embodiments without departing from the spirit and scope of the invention.

What is claimed is:

1. A fluid flow assembly adapted to be disposed in an enclosure having an opening and having a fluid inlet pipe with a fluid inlet pipe end and a fluid outlet pipe with a fluid outlet pipe end disposed in the enclosure, the fluid flow assembly comprising:

a first coupling mechanism adapted to engage the fluid inlet pipe end;

a second coupling mechanism adapted to engage the fluid outlet pipe end;

a fluid flow control assembly rigidly connected between the first and second coupling mechanisms; and a mounting assembly rigidly mounted to the fluid flow assembly and adapted to rigidly mount to at least one of the fluid inlet pipe or the fluid outlet pipe at a location away from the fluid inlet pipe end and the fluid outlet pipe end, wherein the mounting assembly holds the first coupling mechanism and the fluid inlet pipe in sealed engagement and the second coupling mechanism and the fluid outlet pipe in sealed engagement.

2. The fluid flow assembly of claim 1, wherein the mounting assembly is adapted to rigidly mount to both the fluid inlet pipe and the fluid outlet pipe.

3. The fluid flow assembly of claim 1, wherein the enclosure includes a first element permanently and rigidly mounted to the fluid inlet pipe and a second element permanently and rigidly mounted to the fluid outlet pipe, wherein the mounting assembly includes a first member adapted to be removably, rigidly mounted to the first element and a second member adapted to be removably, rigidly mounted to the second element.

4. The fluid flow assembly of claim 3, wherein the first member of the mounting assembly is adapted to accept a threaded fastener.

5. The fluid flow assembly of claim 3, wherein the second member of the mounting assembly is adapted to accept a threaded fastener.

6. The fluid flow assembly of claim 3, further comprising a plate rigidly, mounted between the first and second members of the mounting assembly.

7. The fluid flow assembly of claim 1, further comprising a handle disposed between the first and second coupling mechanisms at a center of gravity of the fluid flow assembly, the handle located in proximity to the opening so that the handle can be reached by a service person through the opening.

8. The fluid flow assembly of claim 1, further including a fluid flow passageway that is connected between the first coupling mechanism and the second coupling mechanism and that includes a one-hundred and eighty degree bend therein.

9. The fluid flow assembly of claim 1, wherein the first and second coupling mechanisms each includes a female coupling end adapted to be disposed over a male coupling end located on the fluid inlet pipe end or the fluid outlet pipe end.

10. The fluid flow assembly of claim 1, wherein the fluid flow control element comprises a regulator.

11. The fluid flow assembly of claim 1, wherein the fluid flow control element comprises two control elements rigidly connected together.

12. The fluid flow assembly of claim 11, wherein each of the control elements is a pilot operated regulator.

13. The fluid flow assembly of claim 1, wherein the first and second coupling mechanisms are each oriented to open in a first direction such that movement of the fluid flow assembly in a second direction disengages the first coupling mechanism from the fluid inlet pipe while disengaging the second coupling mechanism from the fluid outlet pipe.

14. A fluid delivery assembly, comprising:

an enclosure having an opening;

a fluid inlet pipe having a fluid inlet pipe end disposed within the enclosure;

a fluid outlet pipe having a fluid outlet pipe end disposed within the enclosure; and a rigid fluid flow assembly adapted to be disposed within the enclosure and to be removably coupled between the fluid inlet pipe and the fluid outlet pipe, the fluid flow assembly including, a first coupling mechanism adapted to engage the fluid inlet pipe end, a second coupling mechanism adapted to engage the fluid outlet pipe end, a fluid flow control assembly coupled between the first and second coupling mechanisms, and a mounting assembly rigidly mounted to the fluid flow assembly and adapted to rigidly mount to both the fluid inlet pipe at a location away from the fluid inlet pipe end and the fluid outlet pipe at a location away from the fluid outlet pipe end, wherein the mounting assembly holds the first coupling mechanism and the fluid inlet pipe in sealed engagement and the second coupling mechanism and the fluid outlet pipe in sealed engagement.

15. The fluid delivery assembly of claim 14, further including a first element permanently and rigidly mounted to the fluid inlet pipe and a second element permanently and rigidly mounted to the fluid outlet pipe and wherein the mounting assembly includes a first member adapted to be removably, rigidly mounted to the first element and a second member adapted to be removably, rigidly mounted to the second element.

16. The fluid flow assembly of claim 14, further comprising a handle disposed between the first and second coupling mechanisms at a center of gravity of the fluid flow assembly, the handle being located in proximity to the opening so that the handle can be reached by a service person through the opening.

17. The fluid flow assembly of claim 14, wherein the first and second coupling mechanisms are each oriented to open in a first direction such that movement of the fluid flow assembly in a second direction disengages the first coupling mechanism from the fluid inlet pipe while disengaging the second coupling mechanism from the fluid outlet pipe.

\* \* \* \* \*